United States Patent [19]

Aromando

[11] 4,017,951
[45] Apr. 19, 1977

[54] METHOD FOR MANUFACTURING BALL BEARINGS HAVING A SINTERED METAL POWDER OUTER RACE

[75] Inventor: Nick A. Aromando, Lyndhurst, N.J.

[73] Assignee: Hillside Metal Products, Inc., Newark, N.J.

[22] Filed: Jan. 23, 1974

[21] Appl. No.: 435,683

Related U.S. Application Data

[63] Continuation-in-part of Ser. No. 324,733, Jan. 18, 1973, abandoned.

[52] U.S. Cl. .............. 29/149.5 PM; 29/148.4 R; 29/148.4 A; 308/191
[51] Int. Cl.² .......................................... B21D 53/10
[58] Field of Search .............. 308/191, 192, 193; 29/148.4, 148.4 R, 148.4 A, 149.5 PM

[56] References Cited

UNITED STATES PATENTS

| | | | |
|---|---|---|---|
| 2,003,906 | 6/1935 | Searles | 29/148.4 R |
| 2,299,192 | 10/1942 | Tormyn | 29/149.5 PM |
| 2,370,173 | 2/1945 | Kendall | 29/148.4 R |
| 3,137,920 | 6/1964 | Bushi | 29/148.4 A |
| 3,139,666 | 7/1964 | Leciejewski | 29/148.4 A |
| 3,218,705 | 11/1965 | Shirtum | 29/148.4 R |
| 3,714,694 | 2/1973 | Dobson | 29/148.4 R |

FOREIGN PATENTS OR APPLICATIONS

| | | | |
|---|---|---|---|
| 318,916 | 3/1957 | Switzerland | 29/148.4 R |

*Primary Examiner*—C.W. Lanham
*Assistant Examiner*—V. Rising
*Attorney, Agent, or Firm*—Carella, Bain, Gilfillan & Rhodes

[57] ABSTRACT

A method for manufacturing ball bearings and a sintered metal outer race preform for use therein in which the method comprises the steps of forming a generally annular sintered metal outer race preform, the preform preferably having a composition of a 97–99.4% iron and 0.60 to 1.00% carbon; the preform being fabricated from sintered metal powder and having a sinter density of approximately 6.1 to 6.5 grams per cubic centimeter and a sintered hardness of Rb 20 to 40; the preform having arcuate, concentrically disposed inner and outer annular faces, the inner face having a radially inwardly disposed curvilinear portion on one side thereof, and an annular side face on the side of the preform opposite the curvilinear portion joining the inner and outer arcuate faces; the side face on the preform having a concentric generally wedge-shaped annular flange thicker at its bottom than at its top and having a wall distal to the inner annular face, preferably formed as part of a generally V-shaped groove in the side face, which wall is straight from top to bottom and extends at an oblique angle of preferably approximately 45° to the normal to the side face; positioning an inner race within the opening defined by the outer race; positioning a plurality of balls intermediate the inner and outer races; and deforming at least a portion of the flange radially inwardly to generate an entrapment for the said balls between the inner annular face of the preform and the inner race; such deformation preferably being achieved by advancing a generally annular deforming tool having an annular working wall, straight from its top to its bottom, disposed at an angle of approximately 5° from the plane of said side face of the preform, perpendicularly thereto to engage the top of said flange until it is deformed radially inwardly sufficiently to entrap the balls to the extent desired.

28 Claims, 5 Drawing Figures

METHOD FOR MANUFACTURING BALL BEARINGS HAVING A SINTERED METAL POWDER OUTER RACE

CROSS REFERENCE TO RELATED APPLICATIONS

This application is a continuation-in-part of application Ser. No. 324,733, now abandoned filed on Jan. 18, 1973 in the name of Nick A. Aromando and assigned to the same assignee as the present application.

BACKGROUND OF THE INVENTION

There are a wide variety of ball bearings available today comprising fundamentally a generally annular outer race; a generally cylindrical inner race; opposed curvilinear faces on the outer and inner race defining a raceway and a plurality of ball bearings enclosed within the said raceway.

Commonly, ball bearings of the character above described are fabricated from sheet metal which has been appropriately deformed generally as disclosed in U.S. Pat. Nos. 3,317,257; 3,633,982 and 3,667,097. However, sheet metal ball bearings have been found lacking in sufficient strength necessary for many applications. Additionally, sheet metal formed bearings are relatively costly because of the large number of forming steps required.

Optionally, ball bearings of the character described may be fabricated by machining roll-stock. However, machined ball bearings are even costly than those formed from sheet metal.

It is among the objects and advantages of the present invention to provide a method for manufacturing ball bearings by employing an outer race preform fabricated of metal powder which has been appropriately molded and sintered. Such a preform is substantially less expensive to fabricate than the deforming of sheet metal and results in a ball bearing which is substantially stronger than those formed from sheet metal.

It is another object of the present invention to provide a method for manufacturing ball bearings employing the sintered metal outer race preform aforesaid including the step of deforming a portion of the preform adjacent to the raceway to entrap the ball bearings in such a fashion that the ball bearing entrapment is extremely resistant to wear and breakage.

Still another object of the present invention is to provide a method for deforming the aforesaid preform which produces a deformed radially inwardly disposed lip enclosing and entrapping the ball bearings intermediate the inner and outer race, which lip is extremely resistant to fracture due to mechanical stress.

Still yet another object of the present invention is to provide a method for manufacturing ball bearings employing in said method an annular outer race preform having an annular generally wedge-shaped flange concentrically disposed on one side face thereof which has a wall, flat from its top to its bottom, distal to and obliquely disposed to the axis of an inner race-receiving opening therein which flange is deformable radially inwardly by a tool having an annular working wall straight from side to side engagable thereto to generate a radially inwardly disposed ball bearing entrapping lip preferably having a generally flat outer face which lip, when formed in said fashion, has superior resistance to fracture under stress.

SUMMARY OF THE INVENTION

A method for manufacturing ball bearings having a generally annular outer race of molded and sintered metal powder, a cooperative inner race within an opening defined by the outer race and a plurality of ball bearings entrapped in a raceway formed by the inner and outer races comprising forming a generally annular outer race preform of molded and sintered metal powder, said preform having substantially concentric inner and outer annular faces, the said inne annular face having radially inwardly disposed first ball bearing entrapment means, and a side face joining said inner and outer annular faces, said side face having a generally annular wedge-shaped flange substantially concentric with the inner and outer annular faces, the wall of said flange distal to said opening being straight from top to bottom and inclined radially inwardly toward said opening; positioning the inner race within said opening; positioning a plurality of ball bearings intermediate the inner and outer race the ball bearings being entrapped on one side by said first entrapment means on the outer race; and engaging a deforming tool having a flat working face against the wedge-shaped flange deforming at least a portion of said flange radially inwardly to generate an entrapment from the deformed portion which entraps the ball bearings between the inner and outer races on the side of the preform opposite the said first entrapment means of the outer race.

PREFERRED EMBODIMENT OF INVENTION

The objects and advantages as aforesaid as well as other objects and advantages may be achieved by the methods hereinafter described which employ a sintered powdered metal outer race preform preferred embodiments of which are illustrated in the drawings in which.

Figure 1:
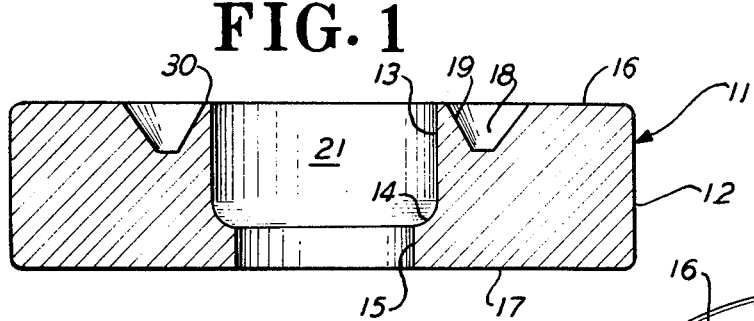
FIG. 1 is a side elevational cross-sectional view of the sintered metal preform.
Figure 2:
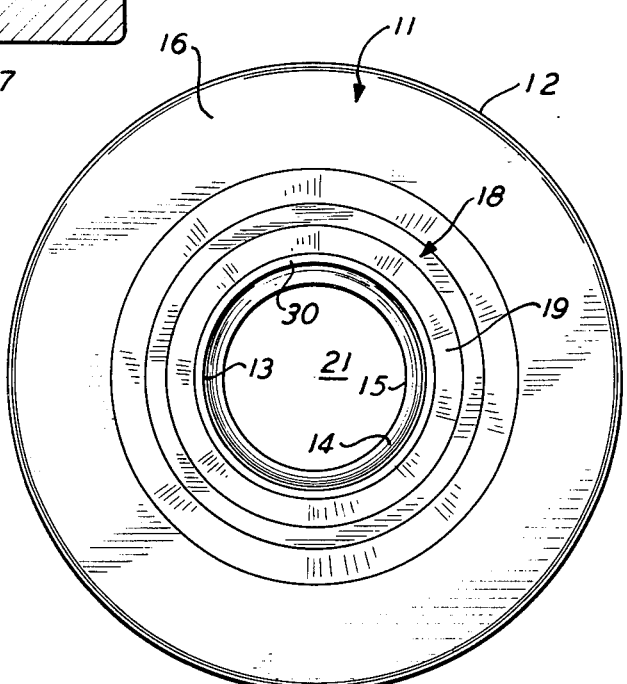
FIG. 2 is a top plan view thereof.

Referring now to the drawings in detail, and in particular to FIGS. 1 to 4, the outer race preform 11 has a generally annular configuration and comprises an annular outer face or bearing surface 12 and an inner annular face 13 concentric therewith. The inner annular face 13 is contiguous with a radially inwardly disposed curvilinear wall 14 communicating with a cylindrical opening 15 concentric with the outer face 12 and inner face 13.

The preform 11 is provided with opposed, generally annular side faces 16 and 17 which preferably are perpendicular to the outer face 12 and inner face 13. Side face 16 opposite the cylindrical opening 15 is provided with a generally V-shaped groove 18 concentric with the outer face 12 and the inner face 13. The groove 18 defines an annular flange 30 generally concentric with the inner face 13 and outer face 12. Wall 19 of the flange 30 is straight from its top to bottom and extends obliquely upwardly from the bottom of groove 18 toward the annulus 21 contiguous with the cylindrical opening 15 preferably at an angle of approximately 45° from the plane of side face 16.

The outer race preform 11 is fabricated from metal powder and preferably has a composition consisting essentially of from 97% to 99.4% iron and 0.60% to 1.00% carbon. The metal powder is first molded in the shape of the preform and the green-stock is thereafter sintered to reach a density of from approximately 6.8 to 7.2 grams per cubic centimeter with a hardness of from approximately Rb 20 to Rb 40.

By way of illustration, a typical composition for the outer race preform consists essentially of 98.5% iron, 0.5% carbon and 1% other compositions including sulfur approximately 0.006%; phosphorus 0.011%; manganese 0.22%; silicon 0.073% and acid insolubles 0.13%.

After deformation to complete the ball bearing structure as hereinafter described, the entire ball bearing is tempering to achieve an ultimate tensile strength of approximately 74,000 psi having had a tensile strength prior to tempering of approximately 44,000 psi with a yield point before tempering of 28,000 psi. The annealing procedures are well known in the art and need be described no further.

Figure 3:
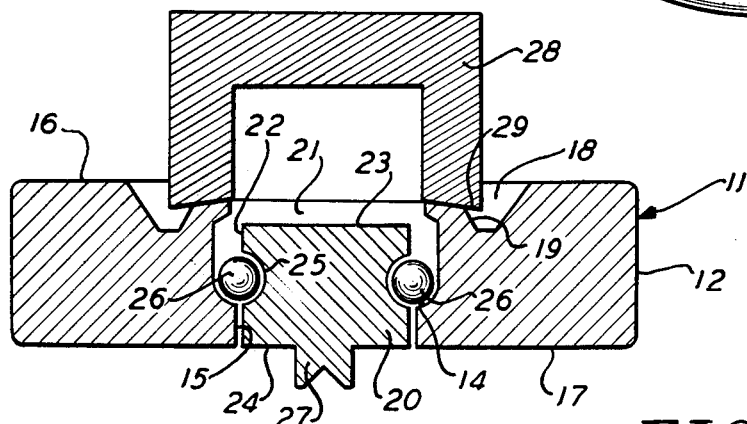
FIG. 3 is a side elevational cross-sectional view of the preform with an inner race positioned within an opening defined by the preform with ball bearings intermediate the inner and outer race and a deforming tool engaged to the outer race in the preliminary stages of deformation.

In order to produce the finished bearing, an inner race 20 is positioned within the opening 21 defined by the preform 11 as illustrated in FIG. 3. The inner race 20 is integral and defines an annular outer face 22 and a pair of spaced-apart opposed side faces 23 and 24 which are preferably perpendicular to the outer annular face 22. The outer annular face 22 is provided with a radially reduced curvilinear groove 25 shaped and dimensioned generally to conform to ball bearings 26, positioned intermediate the outer race preform 11 and the inner race 20.

The inner race 20 may be optionally provided with a mounting shaft 27 or a transverse passage (not shown).

After the inner race 20 and ball bearings 26 are positioned within the opening 21 of the annular outer race preform 11, the flange 30 defined by the V-shaped annular groove 18 must be deformed radially inwardly to overlie a portion of the ball bearings 26 thereby positively entrapping them within the raceway defined between the inner race 20 and outer race preform 11. However, the deformed flange 30 must be sufficiently strong against mechanical stress to resist fracture or damage which would render the bearing inoperative or subject to excessive wear under normal operating conditions.

The usual procedure for deforming the flange 31 radially inwardly would be to provide the wall thereof distal to the opening 21 with an inwardly disposed radius and to engage that wall with a deforming tool having a generally conforming radius. However, after exhaustive tests, it has been determined that if the said wall 19 of the groove 18 is anything other than straight from top to bottom it is relatively weak and subject to fracture or excessive wear when deformed. Therefore, it is essential that the outer race preform 11 be provided with a flange wall distal to the opening 21, wall 19 in FIGS. 1 to 4, which is flat and disposed obliquely toward the axis of the opening 21, the flange 31 being wider at the bottom than at the top.

In order to generate deformation of the wall 19 radially inwardly, an annular deforming tool 28 having a straight wall from side to side is employed. Here again, it has been found that the use of a deforming tool with a radius, even when the wall 19 is straight from top to bottom, produces a deformed wall having inferior stress resistance characteristics.

Figure 4:
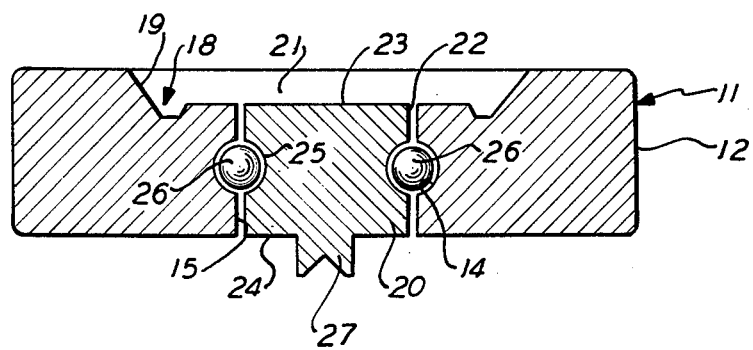
FIG. 4 is a side elevational cross-sectional view of the ball bearing after completion of deformation of the outer race to enclose the balls in the raceway.

Preferably, the deforming tool 28 is provided with an annular working wall 29 straight from side to side which is preferably disposed at an angle of approximately 5° to 25° to the face 16 of the outer race preform 11, with approximately 5° being preferred, is advanced preferably perpendicularly to the face 16 to engage the top 30 of the flange 30. As the deforming tool 28 is advanced toward the face 16 the flange 30 is progressively deformed radially inwardly as illustrated in FIG. 4. The deforming tool is advanced a predetermined distance which is a function of the degree of play desired in the ball bearings.

It has been found that the wall 19 of the V-shaped groove 18 in FIGS. 1 to 4, preferably should be disposed at an angle of approximately 45° to the plane of the face 16 of the preform 11 extending obliquely outwardly toward the annular beaing surface 12. The depth of the groove 18 is a function of the mass of metal in the deformable portion of the flange 30, the size of the entire bearing structure, the size of the ball bearings 26, the depth of the inner face 13 of the preform 11 and the like. Merely by way of illustration, in a bearing having an outer diameter across the outer face 12 of 1 ⅛ inches and a diameter across the inner face 13 of 0.662 inches and a thickness from side face 16 to side face 17 of 9/32 inches with a depth of the cylindrical opening of 0.075 inches, the V-shaped groove 18 preferably has a depth of 3/64 to ⅛ inches with 1/16 inches being preferred.

Figure 5:
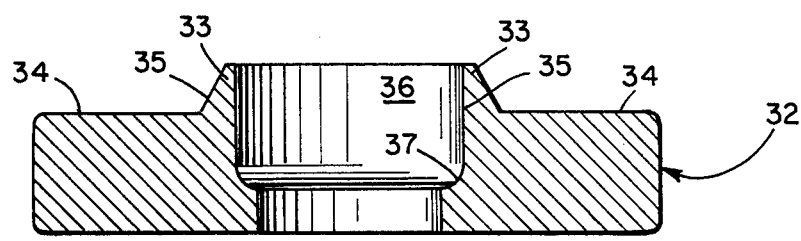
FIG. 5 is a side elevational, cross-sectional view of an alternate form of sintered powdered metal preform.

FIG. 5 illustrates an alternate embodiment of the invention's preform. The preform 32 in FIG. 5 is substantially the same as the preform 11 in FIGS. 1 to 4 with the exception that the deformable flange 33 extends above the side face 34 effectively eliminating the groove 18 of FIGS. 1 to 4. In all the other respects, the preform 32 is the same as preform 11 and the method of assembly and deformation of the flange 33 is also the same.

The wall 35 of flange 33 distal to the opening 36 is straight from top to bottom and disposed obliquely to the axis of the opening 36 at the angles set forth for wall 19 with respect to preform 11. The flange 33 is deformed by a deforming tool having the same characteristics as deforming tool 28.

In both forms of the outer race preform illustrated in FIGS. 1 and 5, respectively, a curvilinear portion on the inner annular face, respectively 14 and 37, is shown. This curvilinear portion functions as a first ball bearing entrapment means and facilities assembly prior to deformation of the wall 19 in FIG. 1 and flange 33 in FIG. 5 which when deformed function as second ball bearing entrapment means. However, it is possible to provide deformable flanges such as flange 33 on both sides of the opening of the outer race and deform one to provide first entrapment means. Simultaneous deformation of opposed flanges is also possible. Such techniques are contemplated as being within the scope of the claims appended hereto.

It is submitted to be manifest that many modifications and variations to the methods and structures disclosed may be made without departing from the spirit of the present invention.

What is claimed is:

1. A method for manufacturing ball bearings having a generally annular outer race of molded and sintered metal powder, a cooperative inner race within an opening defined by the outer race and a plurality of ball bearings entrapped in a raceway formed by the inner and outer races comprising:
   a. forming a generally annular outer race preform of molded and sintered metal powder, said preform having substantially concentric inner and outer annular faces, the said inner annular face having a radially inwardly disposed first ball bearing entrapment means, and a side face joining said inner and outer annular faces, said side face having a generally annular wedge-shaped flange substantially concentric with the inner and outer annular faces, the wall of said flange distal to said opening being straight from top to bottom and inclined radially inwardly toward said opening:
   b. positioning the inner race within said opening;
   c. positioning a plurality of ball bearings intermediate the inner and outer race;
   d. the ball bearings being entrapped on one side by said first entrapment means on the outer race; and
   e. engaging a deforming tool having a flat working face against the wedge-shaped flange deforming at least a portion of said flange radially inwardly to generate an entrapment from the deformed portion which entraps the ball bearings between the inner and outer races on the side of the preform opposite the said first entrapment means of the outer race.

2. A method for manufacturing ball bearings comprising:
   a. the procedure in accordance with claim 1 in which
   b. said portion of said flange is deformed by advancing the working face of the deforming tool against the flange generally parallel to the axis of the opening.

3. A method for manufacturing ball bearings comprising:
   a. the procedure in accordance with claim 2 in which,
   b. the said working face of the deforming tool is disposed at an angle of approximately 5° to 25° to said side face.

4. A method for manufacturing ball bearings comprising:
   a. the procedure in accordance with claim 3 in which
   b. the said deforming tool is advanced a predetermined distance after engaging said flange.

5. A method for manufacturing ball bearings comprising:
   a. the method in accordance with claim 1 and
   b. tempering at least the outer race preform after said deforming to achieve an ultimate tensile strength of at least approximately 74,000 psi.

6. A method for manufacturing ball bearings comprising:
   a. the procedure in accordance with claim 1 in which
   b. said preform hs been sintered to a density of approximately 6.8 to 7.2 grams per cubic centimeter prior to said deforming.

7. A method for manufacturing ball bearings comprising:
   a. the procedure in accordance with claim 6 in which
   b. said preform has been sintered to a hardness of from approximately Rb 20 to Rb 40 prior to said deforming.

8. A method for manufacturing ball bearings comprising:
   a. the procedure in accordance with claim 1 in which
   b. said preform has a composition of from approximately 97% to 99.4% iron and approximately 0.60% to 1.00% carbon.

9. A method for manufacturing ball bearings comprising:
   a. the procedure in accordance with claim 1 in which
   b. the said preform has been sintered to a tensile strength of approximately 44,000 psi and a yield point of approximately 28,000 psi before deforming.

10. A method for manufacturing ball bearings comprising:
    a. the procedure in accordance with claim 1 in which
    b. the said first ball bearing entrapment means is a radially inwardly disposed curvilinear portion on said inner annular face of the outer race.

11. A method for manufacturing ball bearings comprising:
    a. the procedure in accordance with claim 3 and
    b. tempering at least the outer race preform after said deforming to achieve an ultimate tensile strength of approximately at least 74,000 psi.

12. A method for manufacturing ball bearings comprising:
    a. the procedure in accordance with claim 11 and
    b. sintering the said preform to achieve a density of approximately 6.8 to 7.2 grams per cubic centimeter before deforming.

13. A method for manufacturing ball bearings comprising:
    a. the procedure in accordance with claim 12 and
    b. sintering the said preform to achieve a tensile strength of approximately 44,000 psi and a yield point of approximately 28,000 psi.

14. A method for manufacturing ball bearings comprising:
    a. the procedure in accordance with claim 13 in which
    b. the said preform has a composition of from approximately 97% to 99.4% iron and approximately 0.60% to 1.00% carbon.

15. A method for manufacturing ball bearings comprising:
    a. the procedure in accordance with claim 1 in which
    b. the said face of the outer race is provided with a groove generally concentric to the opening,
    c. the said wedge shaped flange being that portion of the outer race intermediate the groove and the opening.

16. A method for manufacturing ball bearings comprising:
    a. the procedure in accordance with claim 15 in which
    b. said portion of said flange is deformed by advancing the working face of the deforming tool against the flange generally parallel to the axis of the opening.

17. A method form manufacturing ball bearings comprising:
    a. the procedure in accordance with claim 16 in which
    b. the said working wall of the deforming tool is disposed at an angle of approximately 5° to 25° to said side face.

18. A method for manufacturing ball bearings comprising:

a. the procedure in accordance with claim 17 in which b. the said deforming tool is advanced a predetermined distance after engaging said flange.

19. A method for manufacturing ball bearings comprising:
    a. the method in accordance with claim 15 and
    b. tempering at least the outer race preform after said deforming to achieve an ultimate tensile strength of at least approximately 74,000 psi.

20. A method for manufacturing ball bearings comprising:
    a. the procedure in accordance with claim 15 in which
    b. said preform has been sintered to a density of approximately 6.8 to 7.2 grams per cubic centimeter prior to said deforming.

21. A method for manufacturing ball bearings comprising:
    a. the procedure in accordance with claim 20 in which
    b. said preform has been sintered to a hardness of from approximately Rb 20 to Rb 40 prior to said deforming.

22. A method for manufacturing ball bearings comprising:
    a. the procedure in accordance with claim 15 in which
    b. said preform has a composition of from approximately 97% to 99.4% iron and approximately 0.60% to 1.00% carbon.

23. A method for manufacturing ball bearings comprising:
    a. the procedure in accordance with claim 15 in which
    b. the said preform has been sintered to a tensile strength of approximately 44,000 psi and a yield point of approximately 28,000 psi before deforming.

24. A method for manufacturing ball bearings comprising:
    a. the procedure in accordance with claim 15 and
    b. deforming said portion of said flange by engaging and advancing a deforming tool having a working wall straight from side to side generally parallel to the axis of said opening said working face of said deforming tool being disposed at an angle of approximately 5° to 25° from the plane of said face upwardly toward the axis of the said opening.

25. A method for manufacturing ball bearings comprising:
    a. the procedure in accordance with claim 24 and
    b. tempering at least the outer race preform after said deforming to achieve an ultimate tensile strength of approximately at least 74,000 psi.

26. A method for manufacturing ball bearings comprising:
    a. the procedure in accordance with claim 25 and
    b. sintering the said preform to achieve a density of approximately 6.8 to 7.2 grams per cubic centimeter before deforming.

27. A method for manufacturing ball bearings comprising:
    a. the procedure in accordance with claim 26 and
    b. sintering the said preform to achieve a tensile strength of approximately 44,000 psi and a yield point of approximately 28,000 psi.

28. A method for manufacturing ball bearings comprising:
    a. the procedure in accordance with claim 27 in which
    b. the said preform has a composition of from approximately 97% to 99.4% iron and approximately 0.60% to 1.00% carbon.

* * * * *

UNITED STATES PATENT OFFICE
CERTIFICATE OF CORRECTION

Patent No. 4,017,951              Dated  April 19, 1977

Inventor(s) NICK A. AROMANDO

It is certified that error appears in the above-identified patent and that said Letters Patent are hereby corrected as shown below:

In the Abstract, line 15, after "outer" "arcuate" should be --annular--

Column 1, line 31, after "even" insert --more--

Column 2, line 11, "inne" should be --inner--

Column 3, line 2, after "toward" cancel "the annulus" and insert instead --a radially enlarged opening--

Column 3, line 21, "tempering" should be --tempered--

Column 3, line 24-25 "annealing" should be --tempering--

Column 3, line 64 "flange 31" should be --flange 30--

Column 4, line 11, after "top" cancel "30"

Column 4, line 21, "beaing" should be --bearing--

Column 4, line 54, "facilities" should be --facilitates--

UNITED STATES PATENT OFFICE
CERTIFICATE OF CORRECTION

Patent No. 4,017,951     Dated April 19, 1977

Inventor(s) NICK A. AROMANDO

It is certified that error appears in the above-identified patent and that said Letters Patent are hereby corrected as shown below:

Column 8, line 11, after "said" and before "face" insert -- side --.

Signed and Sealed this twenty-sixth Day of July 1977

[SEAL]

Attest:

RUTH C. MASON  
Attesting Officer

C. MARSHALL DANN  
Commissioner of Patents and Trademarks